United States Patent [19]
Von Ehr, II et al.

[11] Patent Number: 5,594,855
[45] Date of Patent: Jan. 14, 1997

[54] SYSTEM AND METHOD FOR GENERATING REAL TIME CALLIGRAPHIC CURVES

[75] Inventors: James R. Von Ehr, II; Steven R. Johnson; Samantha Seals-Mason, all of Plano, Tex.

[73] Assignee: Macromedia, Inc., San Francisco, Calif.

[21] Appl. No.: 370,474

[22] Filed: Jan. 9, 1995

Related U.S. Application Data

[63] Continuation of Ser. No. 833,977, Feb. 11, 1992, abandoned.

[51] Int. Cl.$^6$ ............................................. G06F 15/00
[52] U.S. Cl. ............................................. 395/142
[58] Field of Search ............................. 395/140, 141, 395/142, 143; 345/141, 144

[56] References Cited

U.S. PATENT DOCUMENTS

| | | | |
|---|---|---|---|
| 4,601,002 | 7/1986 | Rosenthal | 364/518 |
| 5,134,689 | 7/1992 | Murakami et al. | 395/143 |
| 5,155,813 | 10/1992 | Donoghue et al. | 395/275 |
| 5,241,303 | 8/1993 | Register et al. | 340/706 |

OTHER PUBLICATIONS

Shi, Chong-ming et al., Publication "An Input Method of Calligraphic Characters Using Pressure Sensing Pen", Aug. 12, 1988, IEEE Int Conf on Systems, Man, and Cybernetics, vol. 1, pp. 369–372.

"Digital Synthesis of Calligraphic Script", E. H. Dooijes, published at [Eurographics 1986 Conference, Lisbon, Aug. 1986] and revised as report FVI 86–31, Nov. 1986.

Fontographer Software Package Version 3.5 Documentation Copyright ©1992 Altsys Corporation.

Aldus® FreeHand™ 1.0, Jan. 1988 (Documentation).

*Primary Examiner*—Phu K. Nguyen
*Attorney, Agent, or Firm*—Fulbright & Jaworski L.L.P.

[57] ABSTRACT

A system and method for generating real time calligraphic curves from an input source. The input can be a stylus and the angle of attack of the line with respect to a surface can be fixed or variable. The calligraphic curve can have a fixed or variable width which can be point by point edited to form a new calligraphic curve.

50 Claims, 5 Drawing Sheets

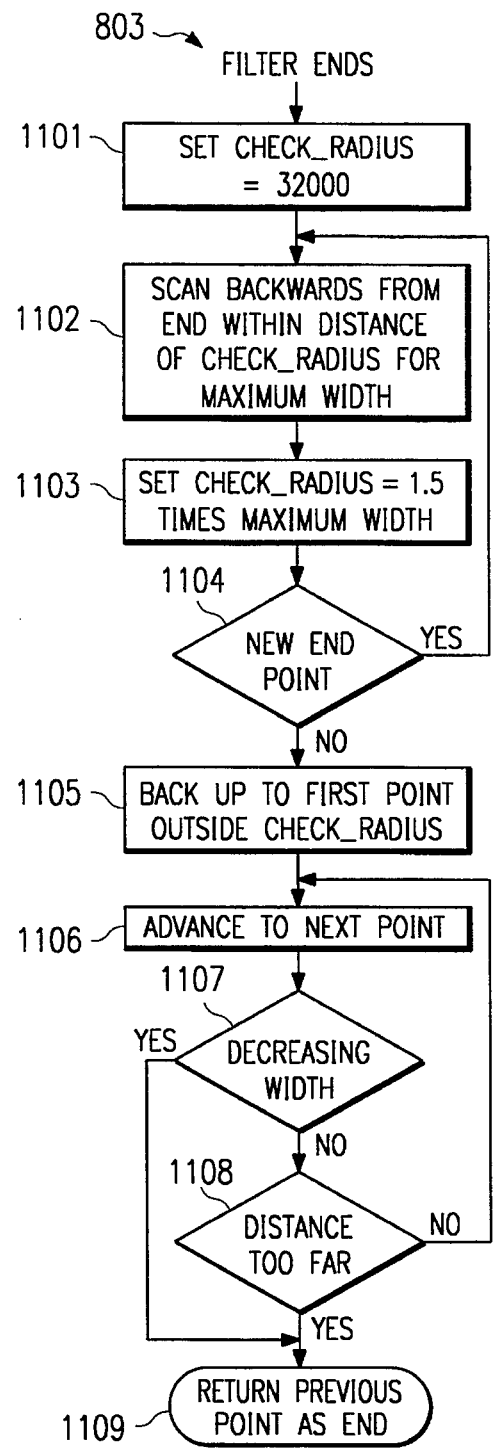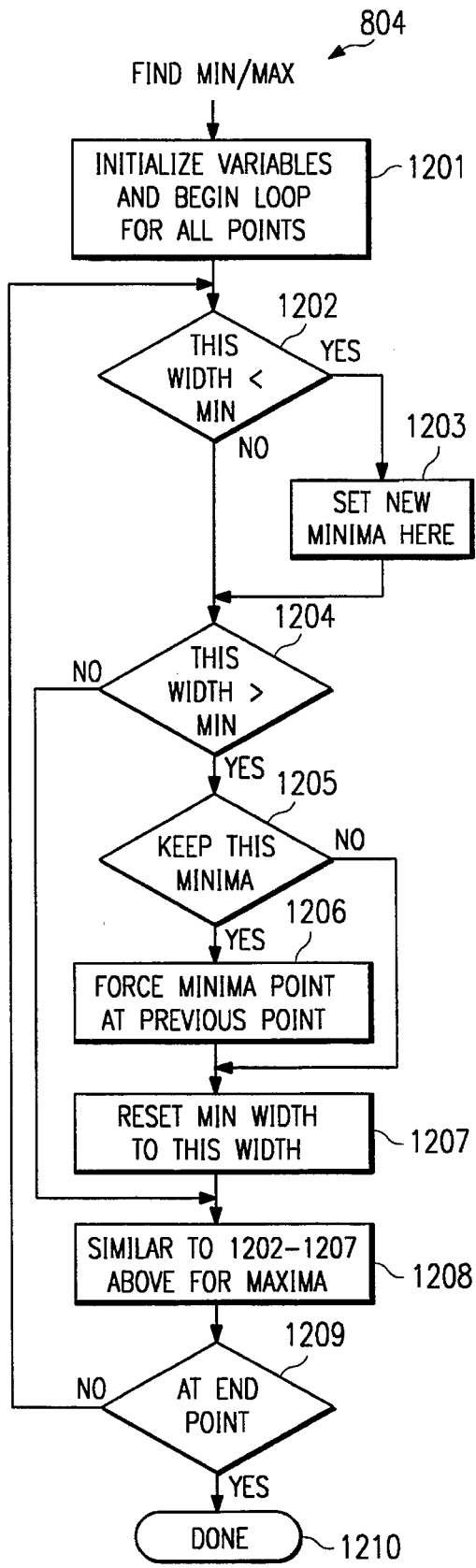
FIG. 11
FIG. 12

SYSTEM AND METHOD FOR GENERATING REAL TIME CALLIGRAPHIC CURVES

This is a continuation of application Ser. No. 07/833,977, filed on Feb. 11, 1992 now abandoned.

TECHNICAL FIELD OF THE INVENTION

This invention relates to graphic presentations and more particularly to a system and method for generating calligraphic curves.

BACKGROUND OF THE INVENTION

Calligraphy is an ancient drawing form and derives its name from beautiful or elegant penmanship. On paper a calligraphic stroke is created by a type of pen called a calligraphic pen which has a long narrow nib which allows ink to flow onto the writing surface. There is a basic "grammar" of movements of the calligraphic pen, called strokes, which in proper combinations produces recognizable letter forms or flourishes. The stroke needed to create a calligraphic letter is called its "ductus," from Latin "to draw." A single stroke is created by using one or all of the following traditional techniques: (1) changing the angle of the chiseled nib; (2) changing the pressure of the nib, thus allowing more ink to flow or widening the nib to allow more ink to cover more surface of the paper; and (3) changing the direction of the nib from right to left and up and down. It is the calligrapher's skill in working the interaction of the physical characteristics of the pen with its stroking techniques that ultimately produces calligraphy.

In modern computer systems, a problem results when a user wishes to generate on a computer screen (or on a printer) a curve representative of a calligraphic stroke. One could simulate static calligraphic paths by any manner of methods on the screen. However, to model the direct stroking is quite another task.

One characteristic of a calligraphic pen stroke is that the nib is carried at a specific angle, thus the beginning of a line stroke and the end of that line stroke should have the same angle with respect to the paper or screen.

In the prior art computer systems this is not the case. In such prior art systems the angle of the stroke at the end of the stroke does not match the angle of the stroke at the start point. While the precise reasons for these mismatches are known only to the system programmer, they certainly leave a very fundamentally inaccurate and unsatisfying image on the screen or on an electronically printed reproduction.

Accordingly, there is a need in the art for a system and method of creating calligraphic strokes from an off-screen input source, when the source provides data points pertaining to length, direction, angle of attack and line width.

A further need exists in the art for such a system and method wherein the angle of a calligraphic stroke at the end of the stroke matches the angle of the stroke at the beginning point.

There is an additional need in the art for such a system and method that allows a user to edit the outline of the drawn calligraphic stroke.

SUMMARY OF THE INVENTION

These and other problems have been solved in a system and method for capturing the trajectory, along with the pen width and angle of a moving stylus, and for providing the real-time graphical feedback to the user, to allow the user to generate calligraphy for letterforms or other drawings. The system takes as an input a polygon and calculates the calligraphic outline of a Bezier curve based on the input polygon and accounts for the changing of the width of the pen based on the angle.

In operation, as the calligraphic stroke is being generated by the user, the image is initially created as an approximation of the line so that the user may see the image being formed in real time. However, in actuality, the system creates the center line, or spine, of the resultant image. The system is designed to look ahead to see where the curve is moving to determine where the outline should be. When the user is finished creating the curved shape, the system operates to construct the outline of the calligraphic image from the created center line. The system then displays on a screen the outline of the calligraphic image having points along the outline periphery which then can be manipulated by the user for the purpose of editing and performing geometric functions with respect to the created line.

Thus, one technical advantage of our system is that a user can move a stylus across a pad and along with various other input sources can create calligraphy for letterforms or other drawings.

Another technical advantage of our system is the creation of a graphics system which, depending upon line width and angle information, creates an outline of the desired calligraphic image on a screen, such that the image contains points editable for controlling subsequent outlines of images.

A still further technical advantage is that our system allows a user to move a stylus across a pad to create a calligraphic image and to sense input from another source to alter in real time the width and angle to create various calligraphic images.

A still further technical advantage of our system is to monitor the pen width and angle of a moving stylus to generate calligraphy.

A still further technical advantage of our system is the ability to generate a font having variable width calligraphic curve segments and to display the font on a video terminal or a printer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which:

FIG. 2 shows in schematic form a calligraphic pen tip having width w, a height h, and an angle a;

FIG. 11 is a flowchart detailing endpoint filtering; and

FIG. 12 is a flowchart for finding the minimum and maximum width values to be utilized within the curve fitter.

DETAILED DESCRIPTION OF THE INVENTION

Before beginning the reader is referred to copending concurrently filed U.S. patent application Ser. No. 07/833,957, entitled "A System and Method of Generating Variable Width Lines," hereby incorporated by reference herein.

To produce the calligraphic outlines described in the present invention, the reader may purchase the "FONTOGRAPHER" software package available from Altsys Corporation, 269 W. Rennet Road, Richardson, Tex. 75080.

Figure 1:
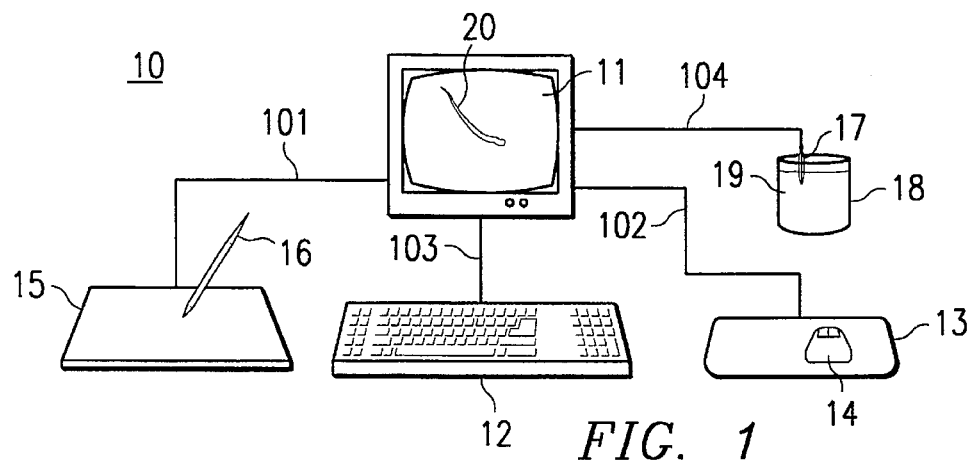
FIG. 1 shows an overall system of the embodiment in which the invention could possibly reside.

Turning first to FIG. 1, there is shown a system 10 which has in it, in one example, a computer graphics display 11 and keypad 12. Also connected to the computer graphics display 11 is mouse 14 with its associated pad 13 and also connected to the computer graphics display 11 is pressure sensitive tablet 15 and its associated pen 16 and also connected to the computer graphics display 11 is a reservoir 18 containing a fluid 19 with its associated stylus 17. Displayed on the screen is a calligraphic image 20 created in any number of different ways, either from the keypad and from a mouse or from a stylus moving across a tablet or from a stylus with a fluid-filled reservoir. In addition, there are many other methods in which such an image can be created using the principles of our invention.

Figure 2:
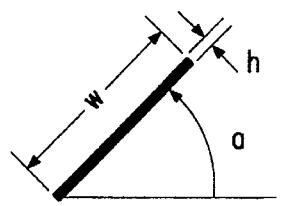

FIG. 2 shows in schematic form a calligraphic pen tip having width w, a height h, and an angle a.

It should be noted that while a calligraphic image is created, the user need not use a calligraphic pen since the system will accept width and angle information from many sources.

Figure 3:
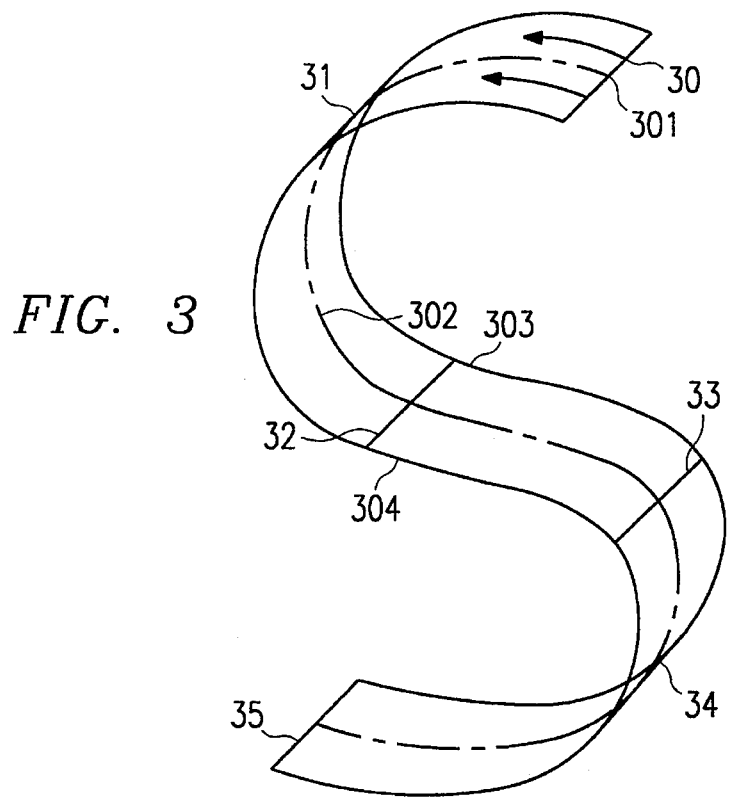
FIG. 3 shows the center of a pen tip drawing a calligraphic image.

FIG. 3 shows the center of the pen tip 301 sweeping from beginning 30 along path trajectories 302 to end 35 and defining a line having sides 303 and 304. When held at an angle, and moved along such a trajectory, the tip of the pen draws the shapes we are used to seeing for Western letterforms. Different angle, pen widths, and trajectories produce different effects, and the art of calligraphy consists of learning which angles and trajectories are required to produce the desired letterforms.

Before starting to draw, the user is asked for a pen width and angle. This information can be entered from a keyboard, a mouse or by a line drawn on a pad. This information is saved by the system.

Referring again to FIG. 1, if the image were to be created using pressure sensitive tablet 15 and pen 16, the user would grasp the pen 16 and proceed to move the pen 16 across the pressure sensitive tablet 15. The calligraphic image is described by using the pressure sensitive tablet 15 in two forms. The current position of the image is represented by the user moving the pen 16 over the tablet 15 and is represented by the position of the pen 16 on the tablet 15. Simultaneously the user may vary the width and angle of the line from the default values at any point using input from any of the several input sources. This allows the user to simultaneously vary both the position of the line and the pen width and angle. This is one of the most fluid and simple techniques for the user to specify a variable width shape and follows the most natural inclination of an artist. One possible alternative method for the user to specify a variable pen width or angle would be to use the mouse 14 and keypad 12 in conjunction with each other, the mouse 14 being used to vary the position, that is, describing the position and direction of the shape by moving the mouse 14 on its pad 13, and simultaneously varying the pen width or angle by using various keys on the keypad 12 to either increase or decrease the pen width or angle at a given point. Alternatively, the user could hold down a varying number of keys to represent a varying pen width or angle at a given point. Another possible alternative method for the user to specify a variable pen width or angle would be to move stylus 17 within the fluid 19 wherein the current position of the line is represented by the user moving the stylus 17 through the fluid 19 within the reservoir 18. Simultaneously, the user may vary the pen width or angle at any point by changing the depth or angle of the stylus 17 within the fluid 19 causing the displacement of the fluid 19 to correspondingly change which is sensed by a sensing device within the reservoir 18.

When the user moves the cursor, mouse, stylus, or other input device, and indicates that a drawing is to be made, the system begins capturing points into an internal memory buffer. This process is further detailed in FIGS. 8–12. At each point, the system saves the x/y coordinate of that point. Additionally, in variable width or angle systems, the system saves the pen width and angle, or differences from the default pen width and angle, if such information is available from the input device.

After each new x/y point is captured, the system can, if desired, provide graphical feedback to the user to show visually the path swept out by the calligraphic pen tip. This feedback technique of the present invention is described in detail with respect to FIGS. 4 and 5.

At the end of the stroke, when the button (or other signal) signifying that drawing is to be made is released, data point capture of the line stops, and the trajectory of the curve is fit from the captured centerline. The technique for curve fitting from a centerline path produces a multitude of x/y points along that path to a few key curve or line definition points that can be used to reconstruct a very similar path with much less information storage required. Such techniques are known in the prior art, and will not be discussed here.

After the curve has been fit to the centerline, the calligraphic stroke outline is generated. The process for doing this will be described in detail in FIG. 6. After this expansion, the centerline, along with the pen angle and width information can either be discarded, or maintained for further editing. The final desired result generated by the present invention is the path outline 303–304 (FIG. 3), which can be used in a graphics system as an outline, or which may be filled using well-known shape filling techniques.

Since the outline has been generated as an explicit curve path, with control points along that shape, it can be further edited by the user, or mathematically transformed just as if it had been explicitly drawn with prior-art drawing tools.

Figure 4:
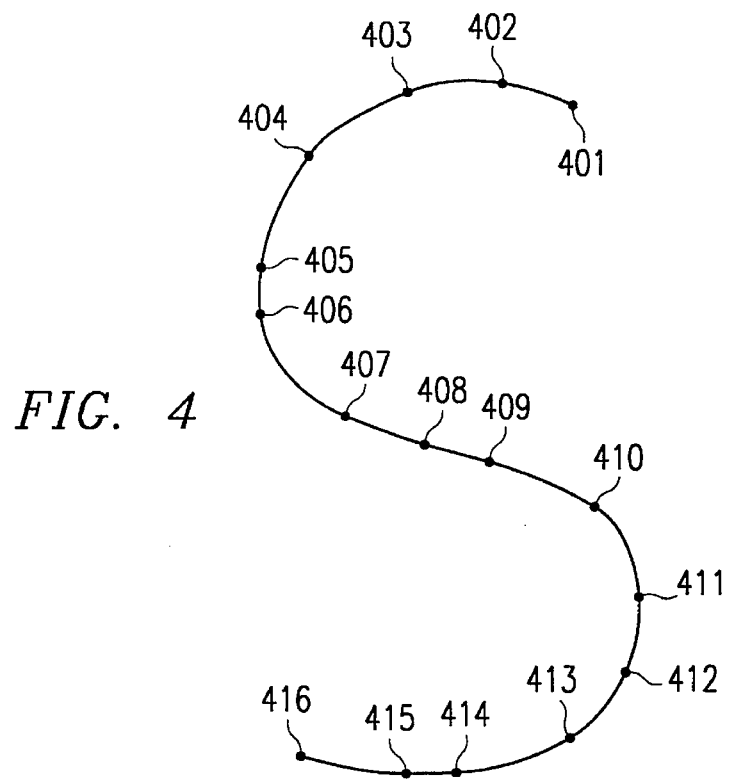
FIG. 4 shows the centerline of the image of FIG. 3.

The actual path points captured may look more like FIG. 4; instead of a smooth continuous trajectory, we have sampled that trajectory at several points 401–416 along its extent. Note that these points are not necessarily evenly spaced, and may actually be slightly offset from the actual path, due to the discrete x/y grid used during position input.

Figure 5:
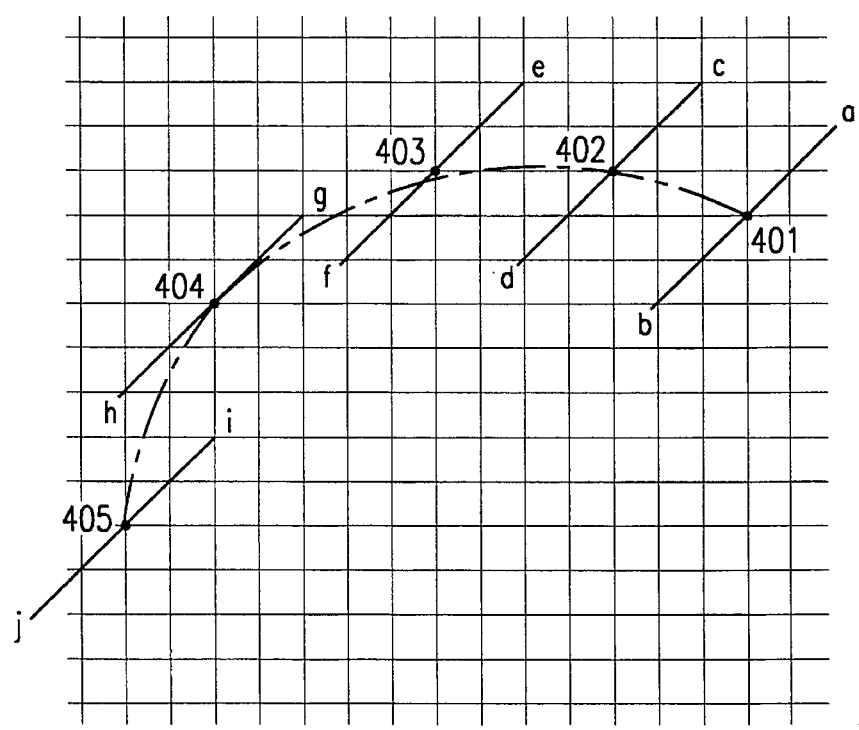
FIG. 5 shows an enlarged view of part of the curve of FIG. 4, with a background grid added for reference.

FIG. 5 shows an enlarged view of part of the curve, with a background grid added for reference and the discrete sample points 401–405 shown as dots. This implicit grid is imposed by the discrete resolution of the input device, and each input point must exist at the intersection of a horizontal and vertical grid line. Note that the grid is not actually drawn in practice, but is simply a reflection of the discrete nature of the input device and output display.

The stroke feedback technique consists of computing, at each input sample point, an offset for the pen tip. Dot 401 is the starting point of the curve. For our example, we will assume the pen angle is 45 degrees, and the starting pen width is 4.24 units. The pen widens to 5.66 units on the third point 403, and remains four units for the rest of the stroke. These units are arbitrarily chosen to make the example simple.

Line ab is the pen width and its offset angle is the pen angle. We will now construct line ab at point 401. This is done by rotating a vector from coordinates (0,0) (the arbitrary point of point 401) to (pen_width,0) by the angle of the pen. In this case, we rotate a vector from (0,0) to (4.24, 0) by 45 degrees, resulting in a vector from (0,0) to (3,3.)

Offset from the point by ½ the vector width and height, truncated to the next lower integer so the point falls on the grid. In this case, we thus offset 1 in x and 1 in y, giving point 401a. We then offset from that point by the negative of the total vector, thus offsetting by −3 in x and −3 in y, giving point 401b. We then draw the line 401a–b for feedback.

The technique of truncating ½ the width to an integer offset, then offsetting from that point by the negative of the entire width assures that the endpoints always fall on an integer grid, and that the length of the line a-b is always as close to the true pen length as we can get (without changing the angle of the pen). With this technique, if the length of the line is not evenly divisible by two, the apparent center of the stroke will be offset slightly from the true center, but the apparent stroke width will be accurate to within +−½ unit of its true width.

Now when the second point is captured, we must fill in the space between the points. We perform a similar pen offset calculation at that second point, resulting in the points c and d. We can then fill the polygon a-c-d-b, giving a closed shape that closely reflects the line an actual calligraphic pen would make in moving from the first point to the second point.

Similarly, at the third point 403, we perform the same pen offset calculation. Here the pen width has varied, and the offset is +−2 units in each direction. Note that the angle remains the same in this example.

As we go around the curve, the filled-in space between the points becomes narrower, just as the real calligraphic pen would draw it.

Figure 6:
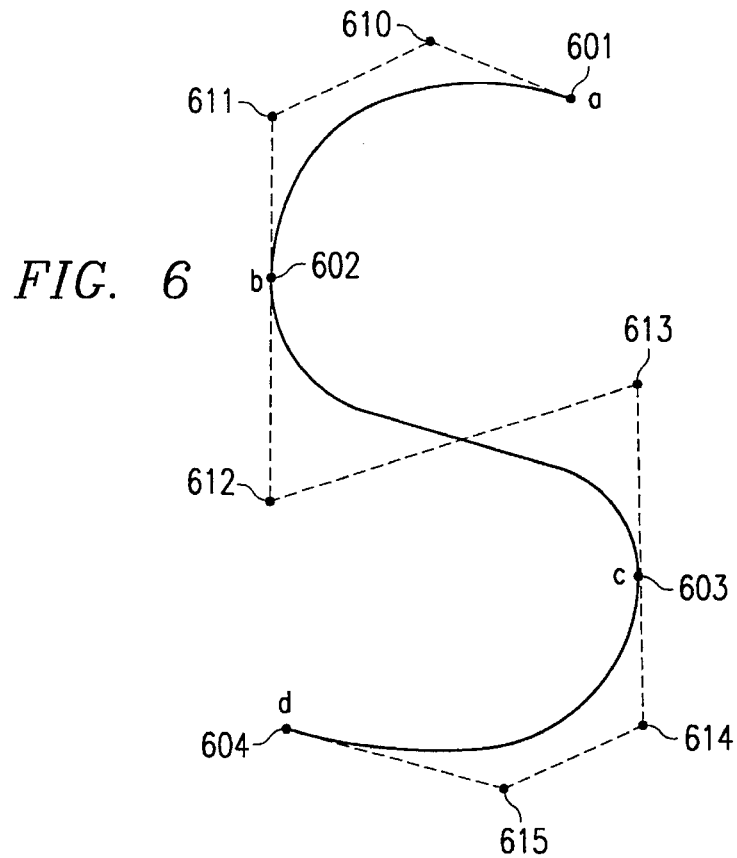
FIG. 6 shows a piece-wise Bezier curve spine of the image of FIG. 4.

Once the trajectory of the calligraphic pen is captured, and the curve fitter reduces the multitude of x/y coordinates of that trajectory to a small number of line and curve points, we have a piece-wise Bezier curve spine as shown in FIG. 6.

The dots 601–604 are Bezier curve endpoints which fall on the curve trajectory, and the dots 610–615 are Bezier curve control points which fall off the actual trajectory but guide the shape of the curve between the oncurve points. A dashed line is drawn connecting the oncurve and offcurve points in the order they are visited during drawing. The mathematics of, and techniques for drawing Bezier curves are well known in the technical literature, and need not be elaborated upon here.

The internal data structure also stores pen angle and width at each point, or a common width and angle can be used for the entire trajectory curve.

In either event, the stroke can be expanded using a similar technique to the one shown in FIG. 5 for the graphical feedback. The major difference between FIG. 5 and the process here is in the order in which we traverse the points.

Figure 7:
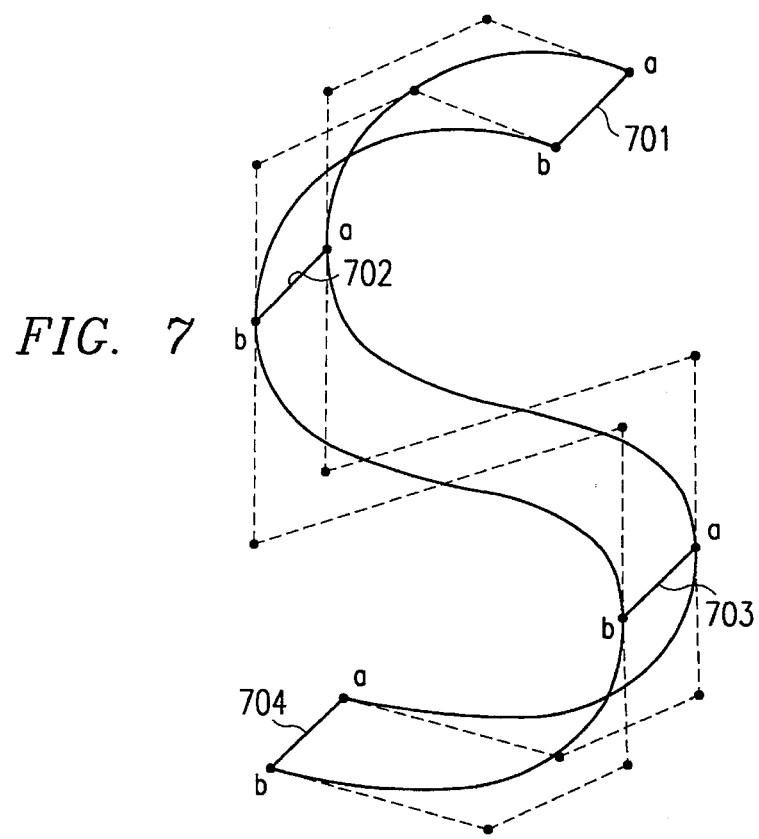
FIG. 7 shows a calligraphic curve generated from the image of FIG. 6.

A curve is generated in FIG. 7 by starting at the beginning of curve 701, offset point 601 (FIG. 6) by ½ the rotated pen offset, as previously described in FIG. 5, giving new point 701a. Similarly offset points 602–604, giving points 702–704.

Now extend the points list. The original figure had only four points; the new one will have twice as many, since each original point generates two offset points.

Starting at the end, point 704a is now offset by the negative of the rotated pen offset, giving new point 704b which is stored in the new path data right after 704. Similarly offset points 703a, 702a, and 701a yielding new points 703b, 702b, and 701b.

The points can be connected, giving us the closed contour shape that mimics the calligraphic pen. If desired, different end caps could be generated; for example round end caps could be generated by projecting out offcurve Bezier control points from points 701a and 701b in a direction away from the interior of the curve. Doing this would cause the end to become rounded instead of flat. The precise amount by which to project out the offcurve points depends on the amount of roundness desired and can be controlled by the user.

The actual shape generated by this basic calligraphic expansion is not true to the physical calligraphic pen due to simplifications in the expansion procedure. In particular, the curve self-intersections between the segments drawn between points 701a and 702a, and points 701b and 702b do not accurately reflect the actual behavior of a calligraphic pen tracing the same pen trajectory; this generated outline actually simulates two separate calligraphic pen strokes separated by a lift near the point of crossover.

Many calligraphic technique books teach the student how to draw strokes that look like this by proper pen lifting, so this generated shape is sometimes desirable.

The graphical feedback during initial data capture described earlier actually reflects the true mark a calligraphic pen would make more accurately; this true expansion is the subject of another, related patent application.

Figure 8:
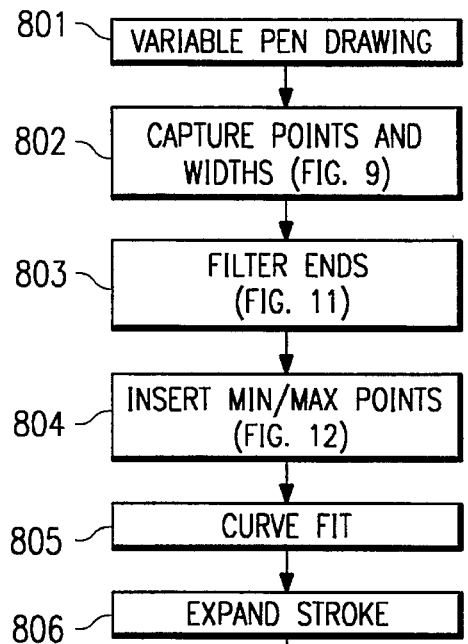
FIG. 8 shows a flowchart illustrating how the system of the present invention implements the capturing of points from an input device, rounds off the ends as desired and fits a curve to the points.

The flowchart of FIG. 8 illustrates how the system of the present invention implements the capturing of points from an input device, rounds off the ends if desired and fits a curve to the points.

The procedure begins at 801 and at 802 the points lying on the midpoint or spine of the calligraphic stroke are captured from the drawing tablet along with the pen width and angle at each of those points. Simple input filtering is also performed at this time. This is explained in more detail in FIG. 9.

Next at 803, filtering of the ends of the shape is required to remove random jitter at the end of the stroke. This process is explained in more detail in FIG. 11.

The calligraphic drawing process moves to 804 where points with minimum and maximum width are marked for the curve fitter so that they are forced to be fit and cannot be removed during curve fitting. This is required to maintain width accuracy. This is further explained in FIG. 12.

At 805, the process of curve fitting reduces the large number of x-y points obtained by tracking an input device like a mouse or data tablet, or by contour-following a scanned image, to a much smaller number (typically 1% or less of the original point count) of line or curve segments that closely approximate the original data. Algorithms to do this with line segments or certain classes of curve segments are well known in the literature. In particular, a prior art algorithm to do interactive curve fitting for piecewise Bezier curves was first publicly demonstrated at the introduction of Aldus® FreeHand™ 1.0, in November 1987 (the program drew its name from this innovative capability of curve fitting freehand drawings). This algorithm calculates the average incoming and outgoing slope at each original input point, picks points of high curvature variation as important corner points, and fits the other original points as closely as possible using Bezier curves or straight lines between the identified corner points. The algorithm is modified in the following ways: 1) During curve fitting the prior art algorithm had removed original input points unneeded for accurate fitting; the modified version does not remove minimum and maximum width points flagged in step 804. This preserves width variations along curves. 2) During clean-up after initial fitting, the prior art algorithm had removed colinear curve-fitted points (i.e. a point lying on a straight line connecting its previous and next curve-fit point neighbors); the modified version does not remove these colinear points if their width is significantly (5–10%) different from the adjacent points. This preserves width variations in straight lines. 3) During clean-up, the prior art algorithm had averaged nearby corner points together to reduce them to one point. The modified version also averages their widths if they are close to the same width, or maintains them as separate points if not.

The important aspect of the present invention is that without the previously described curve fitting, or a process equivalent to such curve fitting, it is not possible to know the actual slope at each expansion point on the spine, and thus it is not possible to accurately know how to expand the curve in a direction perpendicular to the slope of the curve. Determining the true slope at a point requires knowing both the incoming slope and the outgoing slope. If this expansion was attempted during initial point capture, the outgoing slope of each point would not yet be known, so the expansion would not be accurately computable.

Two alternative methods of performing the entire variable-stroke pen drawing process are: 1) to use the graphical feedback provided during the initial drawing as a bitmap which could be curve fit by tracing its outer perimeter, or 2) to capture the spine and width, possibly performing simple filtering on the points and their widths, then draw the result into a temporary bitmap and curve fit to that bitmap. While initially considering both possibilities, the current invention improves upon them by allowing for curve fit and expansion as two separate steps. Thus, it is possible to maintain the original spine points together with width information at each of those points, and perform the expansion at a later time, possibly after editing either the coordinates of the points on the spine, their widths, or inserting or deleting other points and widths.

Figure 9:
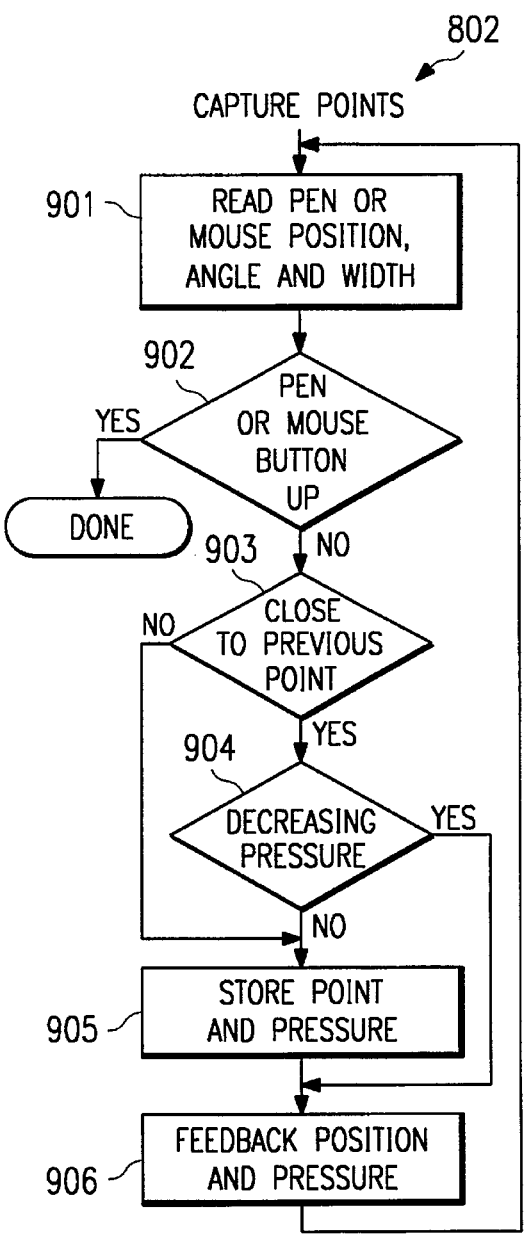
FIG. 9 is a flowchart detailing the process for capturing points and width.

Referring now to FIG. 9, there is shown the flow-chart detailing the capturing of point 802 as previously shown in FIG. 8. This includes some simple filtering for handling the endpoint of the stroke. On a pressure sensitive data tablet, the pressure necessarily goes to zero at the end of each stroke as the stylus is lifted from the tablet surface, although this zero width is not desired if the stroke had high pressure just before the pen lift. Also during the lift up, it is very likely that the pen position will jitter slightly, giving inaccurate positional information which would distort the end of the stroke if not compensated for. This capture process eliminates most such problems, and the final filtering in detail drawing 802 completes the filtering process.

Initially at 901, the points lying on the midpoint or spine of the calligraphic stroke are captured from the drawing tablet or other input device (such as a mouse) along with the pressure at each of those points, and stored in a memory array for later processing. This pressure can be interpreted as the width of the round or oval stroke at that point, as it is treated herein, or in a variety of other ways, such as intensity of color, color gradation, or pen angle and/or width for a calligraphic pen stroke. If the input device is not capable of reporting pressure, it can be simulated by pressing a variable number of keys on the keyboard during point input (more keys for more pressure), or by pressing one key to increase pressure and another key to decrease pressure. If pen angle is reported by the input device, this also can be stored in a similar fashion for directly controlling the angle of a calligraphic pen, or controlling another dimension of variation (for example the pressure could control the width of a stroke and the angle could control its shading or horizontal/vertical aspect ratio).

Next at 902, the process asks whether the pen is lifted up from the pad, or the mouse button is released. If yes, the capturing of the information is completed and the system proceeds to analyze it (see 803 in FIG. 8).

If the pen or mouse button is not up, the process proceeds to 903 where it decides if the location of the current point is relatively distant from the previous point (e.g., farther than 3 to 4 units). If it is distant, it is then stored in the point capture array 905.

If the current point is close to the previous point, then the process determines at 904 whether or not the pressure from the pen, for example, is decreasing. If yes, this new point is not stored. If this is part of the final pen lift, this step prevents spurious data from being stored. If this occurs during the middle of a stroke, the moving pen position will soon be farther away from the last stored point location, and that new point will be stored.

If the pressure is not decreasing, then at 905 the new point and its pressure (and angle, if that is captured) are stored in an array of points for later processing. The point array is expanded as necessary to hold as many points as are captured.

Figure 10:
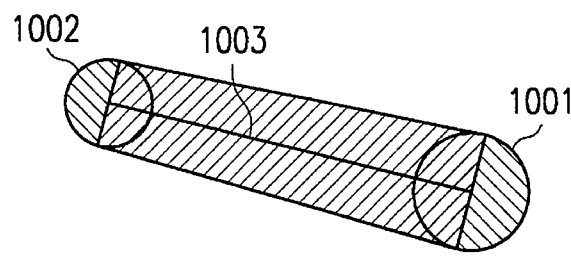
FIG. 10 shows the filling in of the endpoints of the variable width line.

Next at 906, graphical feedback is given to the user. For a variable weight round or oval pen, a circle or oval is drawn at this new point and at the previous point, and a four-sided polygon is drawn to fill in between the circles as shown in FIG. 10. The circles 1001, 1002 are drawn with a radius corresponding to the stroke width at each point, and the polygon is drawn perpendicular to the line 1003 connecting the new point and the previous point, projecting out a distance equal to ½ the width at the corresponding point. Frequently this polygon is unnecessary, due to the points being very close together, but during fast drawing motions the point-to-point spacing may be large enough to leave gaps without this polygon.

The process then returns to 901 to repeat the steps for the next point drawn.

Referring next to FIG. 11 there is illustrated a flow-chart for end-point filtering (see 803, FIG. 8). This process cleans up final hooks and jags caused by lifting up on the pen at the end of a stroke. It is very easy to wiggle the pen a bit at the end of a stroke, and if unfiltered, this wiggle would be curve fit, causing a nasty jag at best, or a self-intersecting figure at worst. This filtering attempts to determine the true end point, before the pen has lifted.

Beginning at 1101, the variable check_radius is set to a large number, for example 32000. This is the radius within which widths are checked. The variable match_point is also set to −1.

Next at 1102, the system scans backwards from the end point within a circle of radius check_radius, finds the maximum width point and notes its point number in variable new_max.

Thereafter at 1103, the system sets the check_radius to 1.5 times the maximum width found in step 1102.

At 1104, the system asks if the variable new_max found in 1102 is different than the previous point of maximum width called match_point. If yes, it sets match_point to the value of new_max and continues the loop another time at 1102. The radius checked is decreasing as the end becomes closer, which means the true desired radius is getting closer.

If the variable new_max is not different from the previous point of maximum width, the system proceeds to 1105 and works backwards from the end point to the first point outside a circle of radius check_radius centered on that end point. This point number is saved in match_point and is the last known good point before the pen lift. The new_max is set to this point also.

At 1106 the new_max is set to its previous value plus one.

Then at 1107, the system asks whether the width at point new_max is less than the width at point match_point. If yes, lift up of the pen has started and the previous value of new_max should return as the number of the end point.

If the width is not decreasing, the system proceeds to 1108 and asks whether the distance from new_max to match_point is less than the previous distance from new_max to match_point. If yes, the furthest point of a jag that doubles back on itself has just passed and should be thrown away. The end point becomes the previous value of new_max. If the distance is not too far, the system returns to 1106 to advance to the next point.

Now referring to FIG. 12, there is shown a flow chart detailing the process for minimum/maximum width finding. This process picks out minimum and maximum width values (min_width and max_width) that should be retained by the curve fitter. It is insensitive to minor width variations which can be caused by jitter from the input device. It is likely that the input pressure, being an analog measurement digitized to fairly low accuracy, will vary slightly during a stroke. Such variations need to be filtered out or they will force an inordinate number of points to be generated by the curve fitter. However, if the variation is significant, it should be retained so the user can create a line that varies from thick to thin and back again which the curve fitter will properly fit.

Beginning with 1201, the min_width and max_width are initialized to initial values of 32000 and −32000 and a loop is begun for all points of the path. Next, at 1202, the system asks whether the width at this point is less than minimum. If yes, then at 1203 a new minimum is set at this point. If the width at this point is not less than the minimum, then at 1204 the system asks if the width at this point is greater than minimum, thus surpassing the minimum width point. If the width at the present point is equal to that of the previous point, then the system moves to 1208 to find the maximum width point. If the width is greater than minimum, then at 1205 the system will inquire whether the previous point is far enough away from the previous minima point (the exact distance being a parameter to this function), and if its width is sufficiently different from the last point.

If yes, then at 1206 the previous point is marked as a minima point.

The system proceeds to 1207 to reset the minimum width to this point's width.

Next at 1208 the system conducts a similar process and procedure as that of 1202–1207, except the procedural steps replace minimum with maximum, and replace greater-than with less-than, and less-than with greater-than. This process finds the maximum widths analogously to the process detailed above for minimum widths.

At 1209 the system asks if the end point of the variable width form has been reached. If no, the procedure is continued at 1202 for all points of the path. If the end point has been reached, the system ends at 1210.

Although the present invention and its advantages have been described in detail, it should be understood that various changes, substitutions and alterations can be made herein without departing from the spirit and scope of the invention as defined by the appended claims.

What is claimed is:

1. A system for generating a calligraphic curve from an input consisting of aspect data pertaining to said calligraphic curve, said system comprising:

means for accepting trajectory data for said calligraphic curve to be generated;

means for accepting angle data pertaining to an angle with respect to radial coordinates of a plane;

means for accepting width data pertaining to a width of said curve; and means, operable substantially concurrently with acceptance of said trajectory data, for generating said calligraphic curve based upon said trajectory data, said width data and said angle data, wherein said generating means further includes:

means for generating a spine, said spine comprising a plurality of points disposed along a longitudinal centerline of said calligraphic curve, each point having aspect data associated therewith, said aspect data comprising said trajectory data, said width data and said angle data at each said point, wherein said aspect data of each said point of said spine is used to generate a top control point associated with a top peripheral outline of said calligraphic curve and a bottom control point associated with a bottom peripheral outline of said calligraphic curve, wherein said top and bottom control points are movable to modify said calligraphic curve.

2. The system set forth in claim 1 further comprising a screen display for presenting said calligraphic curve.

3. The system set forth in claim 1 further including:

means for changing said angle data while said trajectory data are being accepted, thereby changing said calligraphic curve.

4. The system set forth in claim 1 further including:

means for changing said width data while said trajectory data are being received, thereby changing said calligraphic curve.

5. The system set forth in claim 1 wherein said trajectory data are received from a stylus moving with respect to a surface.

6. The system set forth in claim 5 wherein said stylus includes a pointed end which interacts with said surface.

7. The system set forth in claim 5 wherein said stylus includes a blunt end which interacts with said surface.

8. The system set forth in claim 7 wherein said end of said stylus is a calligraphic pen tip and wherein said angle data is controlled by an angle of said pen tip with respect to radial coordinates of a plane at any point along said trajectory.

9. The system set forth in claim 5 wherein said width data are provided by a pressure of said stylus against said surface.

10. The system set forth in claim 1 further comprising:
    means for comparing said aspect data of said plurality of points along said spine; and
    means for determining an endpoint of said calligraphic curve as a function of said width data and distance, said distance being the magnitude of a vector projecting from one point among said plurality of said points to another point among said plurality of said points.

11. A method for generating a calligraphic curve from an input comprising aspect data pertaining to said calligraphic curve, the method comprising the steps of:
    accepting trajectory data for said calligraphic curve to be generated;
    accepting angle data pertaining to an angle with respect to radial coordinates of a plane;
    accepting width data pertaining to a width of said calligraphic curve; and
    generating, substantially concurrently with said step of accepting said trajectory data, a calligraphic curve based upon said trajectory data, said width data and said angle data, wherein said generating step further includes the substep of:
    generating a spine, said spine comprising a plurality of points disposed along a longitudinal centerline of said calligraphic curve, each point having aspect data associated therewith, said aspect data comprising said trajectory data, said width data and said angle data at each said point, wherein said aspect data of each said point of said spine is used to generate a point associated with a top peripheral outline of said calligraphic curve and a point associated with a bottom peripheral outline of said calligraphic curve, said peripheral points movable to modify the generated calligraphic curve.

12. The method set forth in claim 11 further including the steps of:
    modifying said generated calligraphic curve by changing said angle data as said trajectory data are being accepted.

13. The method set forth in claim 11 further including the step of:
    modifying said generated calligraphic curve by changing said width data as said trajectory data are being accepted.

14. The method set forth in claim 11 wherein said step of accepting trajectory data includes the substep of receiving data from a stylus moving with respect to a surface.

15. The method set forth in claim 14 wherein said stylus comprises a calligraphic pen having a blunt tip adapted to cooperate with said surface and wherein said angle data is controlled by the angle of said blunt tip with respect to radial coordinates of a plane on said surface at any point along its trajectory.

16. The method set forth in claim 14 wherein said width data are provided by a pressure of said stylus against said surface.

17. The method set forth in claim 11 further comprising the steps of:
    comparing said accepted trajectory data, said accepted width data and said accepted angle data associated with said plurality of points along said spine; and
    determining an endpoint of said calligraphic curve as a function of said width data and distance, said distance being the magnitude of a vector projecting from one point among said plurality of said points to another point among said plurality of said points.

18. The method set forth in claim 17 further comprising the substeps of:
    scanning said plurality of points from a current endpoint, said current endpoint being the most recently generated point along said spine, through points of said plurality of points in inverse order of generation within a circle, said circle having said current endpoint as the center and a selected radius;
    determining a maximum width point, said maximum width point being a point among said plurality of points within said circle wherein said width data is the maximum of said plurality of points scanned, and resetting said radius to be a multiple of said width data at said maximum width point;
    determining if said maximum width point is the same point as said current endpoint, setting said current endpoint to said maximum width point and repeating said scanning and determining substeps if said maximum width point was not the same point as said current endpoint;
    selecting a comparison point, said comparison point being the first point of said plurality of points outside of said circle when advancing along said spine from said current endpoint along said spine through said plurality of points in inverse order of generation, and a next point, said next point being a point among said plurality of points nearest to said comparison point when advancing along said spine from said comparison point toward said current endpoint of said spine; and
    setting a prior comparison point to said comparison point, setting said comparison point to said next point, and setting said next point to a point of said plurality of points nearest to said comparison point when advancing along said spine from said comparison point toward said current endpoint of said spine and repeating this setting substep if said width data associated with said comparison point is not greater than said width data associated with said next point, but if said width data associated with said current endpoint is greater than said width data associated with said next point or if the distance from said comparison point to said current endpoint is less than said distance from said prior comparison point to said current endpoint setting an endpoint to said comparison point.

19. A method of constructing a desired graphic representation of a calligraphic line wherein an angle of yaw with respect to radial coordinates of a surface affects the attributes of said calligraphic line and wherein said calligraphic line has at least one controlled width along any segment thereof, said method comprising the steps of:
    accepting input data from a user, said input data including direction data pertaining to a desired direction of said calligraphic line, width data pertaining to one said controlled width of said calligraphic line at any of a plurality of points along said calligraphic line and angle data pertaining to said angle of yaw at any point of said plurality of points along said calligraphic line;

constructing from said input data an outline image of said calligraphic line, said outline image representative of a composite of said direction data, said width data and said angle data, wherein said outline image contains outline points spaced therealong, said outline points operable for editing said outline image, wherein said constructing step includes the intermediate substep of:

establishing on a non-imaging basis a centerline of said desired graphic representation of said calligraphic line, said centerline comprising a plurality of sample points established at various positions along said centerline, each said sample point having associated therewith aspect data pertaining to said width data and said angle data of said calligraphic line at each said sample point, said aspect data being used in conjunction with each said sample point to generate a control point associated with a top peripheral outline of said outline image and a control point associated with a bottom peripheral outline of said outline image.

20. The method set forth in claim 19 wherein said direction data are accepted from an object moving across a surface.

21. The method set forth in claim 20 wherein said width data are accepted from pressure data generated between said object and said surface during a course of movement of said object.

22. The method set forth in claim 20 wherein said width data are accepted from a source external to said object.

23. The method set forth in claim 22 wherein said external source is a key pad.

24. The method set forth in claim 20 wherein said angle data are accepted from a source external to said object.

25. The method set forth in claim 20 wherein said object is a stylus having a point of contact with said surface.

26. The method set forth in claim 25 wherein said stylus further comprises a means to cooperate with said surface to provide data representative of said angle of yaw.

27. The method set forth in claim 19 further comprising the step of:

displaying, as an intermediate image prior to creating said outline image, a replica image corresponding to said direction data, said width data and said angle data of said calligraphic line as obtained from said input data, said intermediate image being displayed concurrently with said acceptance of said direction data.

28. The method set forth in claim 19 further including the steps of:

moving any selected ones of said control points; and creating a revised outline image of said desired graphic representation incorporating all of said control points.

29. The method set forth in claim 19 further including the step of:

displaying an image of a filled-in shape of said outline image.

30. The method set forth in claim 19 further comprising the steps of:

comparing said accepted input data associated with said plurality of sample points along said centerline; and determining an endpoint of said calligraphic line as a function of said width data and distance, said distance being the magnitude of a vector projecting from one point among said plurality of sample points to another point among said plurality of sample points.

31. The method set forth in claim 30 further comprising the substeps of:

scanning said plurality of sample points from a current endpoint, said current endpoint being the most recently established point along said centerline, through points of said plurality of points in inverse order of establishment within a circle, said circle having said current endpoint as the center and a selected radius;

determining a maximum width point, said maximum width point being a point among said plurality of sample points within said circle wherein said width data is the maximum of said plurality of sample points scanned, and resetting said radius to be a multiple of said width data at said maximum width point;

determining if said maximum width point is the same point as said current endpoint, setting said current endpoint to said maximum width point and repeating said scanning and determining substeps if said maximum width point was not the same point as said current endpoint;

selecting a comparison point, said comparison point being the first point of said plurality of sample points outside of said circle when advancing along said centerline from said current endpoint along said centerline through said plurality of sample points in inverse order of establishment, and a next point, said next point being a point among said plurality of sample points nearest to said comparison point when advancing along said centerline from said comparison point toward said current endpoint of said centerline; and setting a prior comparison point to said comparison point, setting said comparison point to said next point, and setting said next point to a point of said plurality of sample points nearest to said comparison point when advancing along said centerline from said comparison point toward said current endpoint of said centerline and repeating this setting substep if said width data associated with said comparison point is not greater than said width data associated with said next point, but if said width data associated with said current endpoint is greater than said width data associated with said next point or if the distance from said comparison point to said current endpoint is less than said distance from said prior comparison point to said current endpoint setting an endpoint to said comparison point.

32. A system for establishing a data file of positional editable control points of a curve, said data file created from a series of inputted data points, said inputted data points including line direction data, width data and angle of yaw data at any point along said curve, said system comprising:

means for processing said inputted data points into a first replica image, said first replica image generated from a centerline of said first replica image and vector data associated with selected data points along said centerline, said vector data being used in conjunction with said associated selected data points to generate a top peripheral outline and a bottom peripheral outline disposed around said centerline of said first replica image; and means for creating said data file of editable curve control points as an outline of said first replica image.

33. The system set forth in claim 32 further comprising:

means for controllably displaying said first replica image; and means for displaying said outline of said first replica image in substitution for said first replica image.

34. The system set forth in claim 32 further including:

means, operable while said outline of said first replica image is displayed, for rearranging any of said curve control points; and means for displaying a subsequent replica image corresponding to any rearranged curve control points.

35. The system set forth in claim 32 further including a video screen for displaying said first replica image, said outline of said first replica image, and said subsequent replica image.

36. The system set forth in claim 32 further including a printer for displaying said first replica image, said outline of said first replica image, and said subsequent replica image.

37. The system set forth in claim 32 further comprising:
means for generating said line direction data;
means for generating said width data; and
means for generating said angle of yaw data.

38. The system set forth in claim 37 wherein said line direction data generating means includes an object moving across a medium.

39. The system set forth in claim 38 wherein said medium is hard and wherein said width data generating means includes means for determining pressure of said object with respect to said medium.

40. The system set forth in claim 37 wherein said angle of yaw data generating means includes a signal source external to said object.

41. The system set forth in claim 40 wherein said signal source is a key pad.

42. The system set forth in claim 32 wherein said processing means includes:
means for creating a set of data points representative of the center line of said replica outline, each said center line data point including data vectors pertaining to a width and an angle of yaw of said replica image at said centerline data point.

43. The system set forth in claim 32 further comprising:
means for comparing said selected data points along said centerline; and
means for determining an endpoint of said first replica image as a function of said width data and distance, said distance being the magnitude of a vector projecting from one point among Said selected data points to another point among said selected data points.

44. A method for generating calligraphic curves from a plurality of input points located along a centerline of the calligraphic curve, the method comprising the steps of:
accepting position data associated with the input points along the centerline, the position data consisting of a horizontal position and a vertical position of each input point in the plane of a drawing surface;
accepting width data pertaining to a width of the calligraphic curve at each accepted position data;
accepting angle data pertaining to a reference angle with respect to radial coordinates of a plane at each accepted position data;
identifying position data of high curvature on the centerline where the slope changes by more than a predetermined maximum of slope change;
selecting the position data of high curvature as corner points;
approximating portions of the centerline between corner points with a plurality of linear curve segments or non-linear curve segments; and
reducing the number of input points necessary to represent a linear curve segment by determining the maximum width data and minimum width data along the linear curve segment and storing in a data file only the width data, angle data and position data associated with the corner points if the maximum width data and minimum width data along the linear curve segment vary by less than a predetermined maximum of width variance.

45. The method for generating calligraphic curves as set forth in claim 44 including the further step of reducing the number of input points necessary to represent a linear curve segment by determining the maximum width data and minimum width data along the linear curve segment and, if the maximum width data and the minimum width data vary by more than a predetermined maximum of width variance, storing in a data file the width data, angle data and position data associated with the corner points and the width data, angle data and position data associated with a plurality of intermediate points along the centerline wherein the width data at adjacent intermediate points does not vary by more than a predetermined percentage.

46. The method for generating calligraphic curves as set forth in claim 45 including the further step of creating an outline image of the calligraphic curve from the reduced number of input points stored in the data file by generating a top peripheral outline and a bottom peripheral outline of the centerline using the position data, width data and angle data stored in the data file.

47. The method for generating calligraphic curves as set forth in claim 44 further comprising the steps of:
comparing said width data associated with any of said input points to said width data associated with any other of said input points; and
determining an endpoint of said calligraphic curves as a function of said width data and distance, said distance being the magnitude of a vector projecting from one input point among said input points to another input point among said input points.

48. A method for generating calligraphic curves from a plurality of input points located along a centerline of the calligraphic curve, the method comprising the steps of:
accepting position data associated with the input points along the centerline, the position data consisting of a horizontal position and a vertical position of each input point in the plane of a drawing surface;
accepting width data pertaining to a width of the calligraphic curve at each accepted position data;
accepting angle data pertaining to a reference angle of the calligraphic curve at each accepted position data;
identifying position data of high curvature on the centerline where the slope changes by more than a predetermined maximum of slope change;
selecting the position data of high curvature as corner points;
approximating portions of the centerline between corner points with a plurality of linear curve segments or non-linear curve segments; and
reducing the number of input points necessary to represent a non-linear curve segment by comparing the width data at a plurality of input points along the linear curve segment and, if the width data at the input points along the non-linear curve segment varies by less that a predetermined maximum of width variance, storing in a data file only the width data, angle data and position data of Bezier curve control points associated with a Bezier curve that approximates the non-linear curve segment.

49. The method as set forth in claim 48 including the further step of reducing the number of input point necessary to represent a non-linear curve segment by determining the maximum width data and minimum width data associated with input points along the non-linear curve segment and, if the maximum width data and the minimum width data vary by more than a predetermined maximum of width variance, storing in a data file the width data, angle data and position data associated with the corner points, the width data, angle data and position data associated with the input points where the maximum width and minimum width occur, and the width data, angle data and position data of Bezier curve control points associated with Bezier curves that approximate the subsegments of the non-linear curve segment connecting between the corner points, the input point where the maximum width occurs and the input point where the minimum width occurs.

50. The method as set forth in claim 49 including the further step of creating an outline image of the calligraphic curve from the reduced number of input points stored in the data file by generating a top peripheral outline and a bottom peripheral outline of the centerline using the position data, width data and angle data stored in the data file.

* * * * *